April 14, 1959

H. C. ZIMMER 2,881,901

MAGNETIC CONVEYOR

Filed June 13, 1956

INVENTOR.
Harold C. Zimmer
BY
Frease & Bishop
ATTORNEYS

April 14, 1959  H. C. ZIMMER  2,881,901
MAGNETIC CONVEYOR
Filed June 13, 1956  4 Sheets-Sheet 2
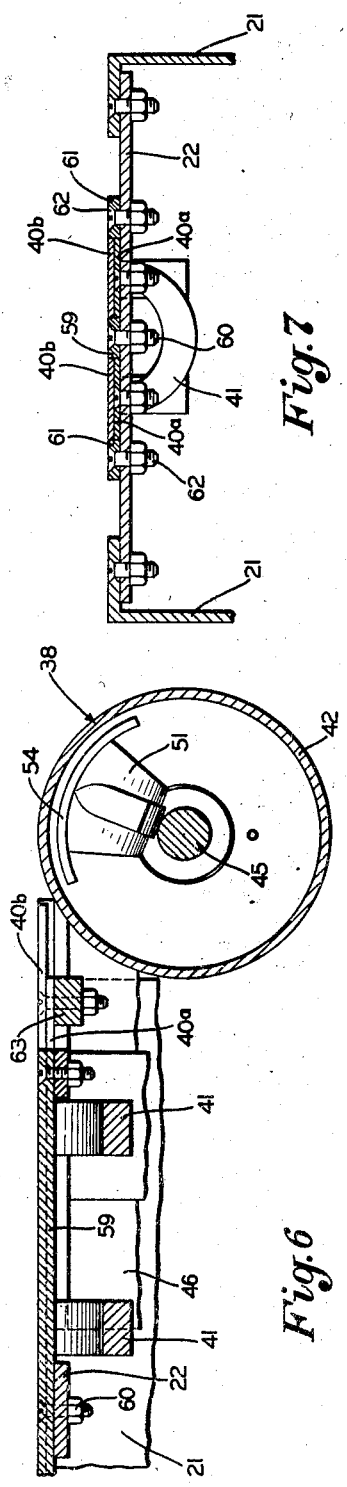
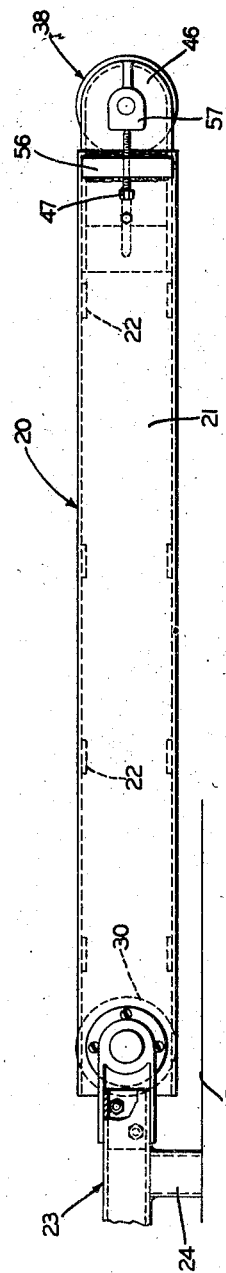
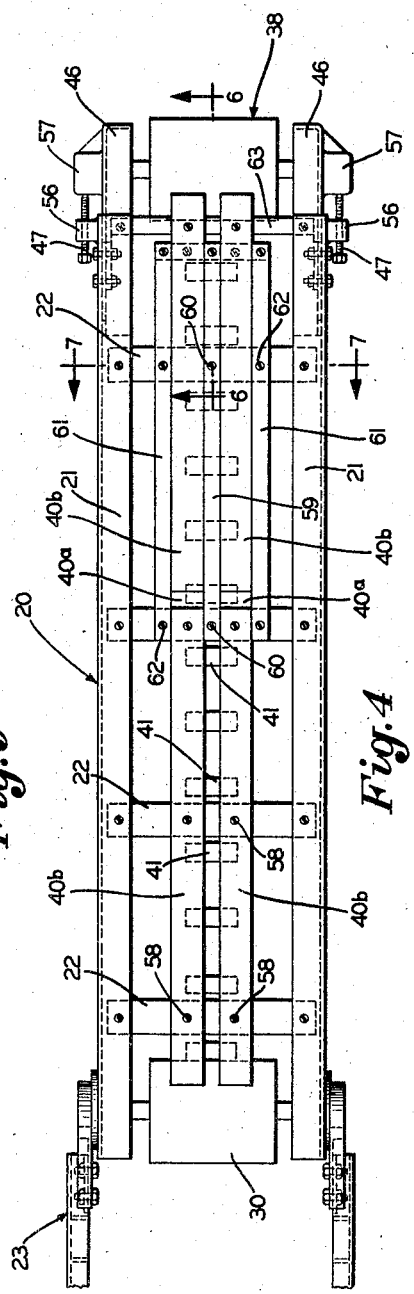
INVENTOR.
Harold C. Zimmer
BY
Frease & Bishop
ATTORNEYS April 14, 1959  H. C. ZIMMER  2,881,901
MAGNETIC CONVEYOR Filed June 13, 1956  4 Sheets-Sheet 3

INVENTOR.
Harold C. Zimmer
BY
Frease & Bishop
ATTORNEYS

April 14, 1959     H. C. ZIMMER     2,881,901
MAGNETIC CONVEYOR
Filed June 13, 1956     4 Sheets-Sheet 4
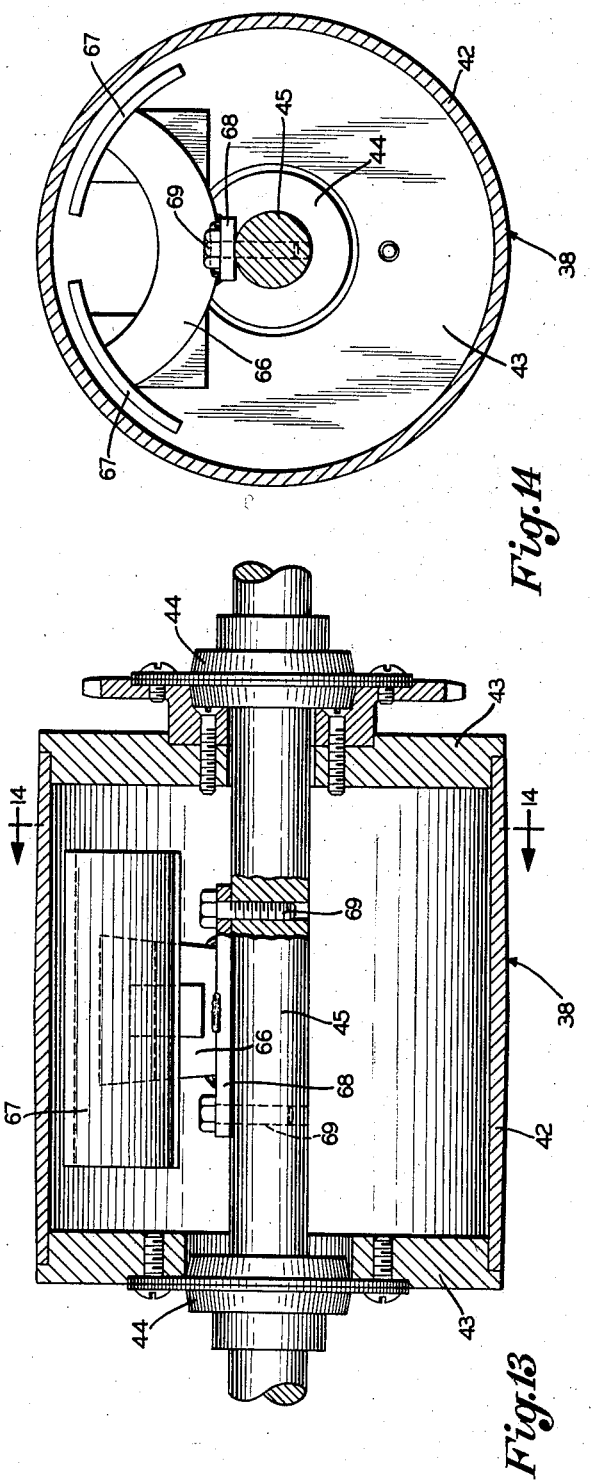
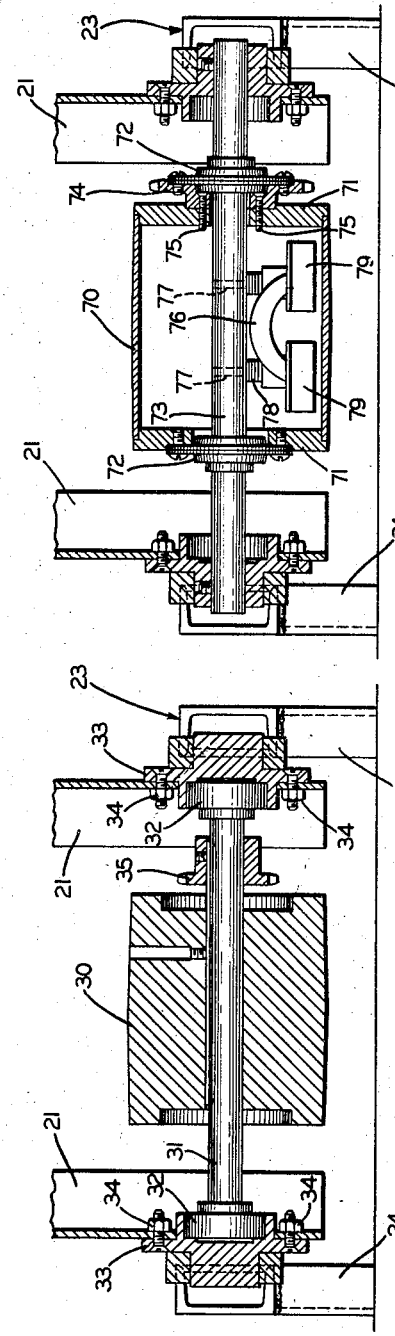
INVENTOR.
Harold C. Zimmer
BY Frease & Bishop
ATTORNEYS

United States Patent Office 2,881,901
Patented Apr. 14, 1959

2,881,901

MAGNETIC CONVEYOR

Harold C. Zimmer, Lima, Ohio, assignor to The Homer Manufacturing Co., Inc., Lima, Ohio, a corporation of Ohio Application June 13, 1956, Serial No. 591,143

5 Claims. (Cl. 198—41)

The invention relates to magnetic conveyors for conveying ferrous articles, and more particularly to a conveyor of the general type comprising an endless conveyor belt located over spaced drums, one of which is power driven, with pole plates located directly beneath the conveying flight of the belt and connected to a plurality of permanent horseshoe magnets, providing a permanent magnetic field extending from one drum to the other.

It is an object of the invention to improve and enhance magnetic conveyors of this general type and to increase the efficiency thereof.

Another object is to provide a magnetic conveyor of the character referred to especially adapted for conveying cylindrical articles.

A further object is to provide such a magnetic conveyor in which the magnetic pole plates are located at right angles to the direction of travel of the conveyor belt.

A still further object is to provide a magnetic conveyor of this type in which one or both of the drums are magnetic drums comprising a drum shell revolving around a fixed magnetic field within the drum shell.

Another object is to provide such a magnetic drum having means for adjusting the magnetic field around the circumference of the drum shell.

A further object of the invention is to provide a magnetic conveyor of the character referred to in which the magnetic pole plates are adjustable so as to maintain a fixed clearance between the same and the drum.

A still further object is to provide a special construction of magnetic field within the drum of conveyors adapted for conveying cylindrical articles.

The above and other objects, apparent from the drawings and following description, may be attained, the above described difficulties overcome and the advantages and results obtained, by the apparatus, construction, arrangement and combinations, subcombinations and parts which comprise the present invention, a preferred embodiment of which, illustrative of the best mode in which applicant has contemplated applying the principle, being set forth in detail in the following description and illustrated in the accompanying drawings.

In general terms the invention may be described as comprising a frame having a drum journalled at each end thereof and an endless conveyor belt located around said drums. A magnetic field is located directly beneath the conveying flight of the belt, and comprises pole plates with an air gap therebetween and horseshoe magnets having their poles connected to the pole plates.

These pole plates may extend longitudinally from one drum to the other, or, where it is desirable to convey cylindrical articles, the pole plates may be located transversely to the direction of travel of the belt.

The upper or head drum is a magnetic drum comprising a drum shell revolving around a fixed magnetic field located therein and adjustable around the circumference of the drum to regulate the position of discharge of ferrous articles from the belt, at the head drum.

Where it is desired to pick up ferrous articles from the floor, the lower or tail drum may also be a magnetic drum comprising a drum shell revolving around a fixed magnetic field.

The magnetic field within the drum shell may conform to the construction of either of the above described pole plates located beneath the belt.

For the purpose of maintaining a very close clearance between the magnetic pole plates and the drum surface in order to link the magnetic flux from the magnetic pole plates to the magnetic field in the drum, the magnetic pole plates are provided with slidable portions adapted to be slidably moved by a special coupling arrangement to compensate for adjustment of the drum for normal belt stretch.

Having thus briefly described the invention, reference is now made to the accompanying drawings showing preferred embodiments of the invention, in which;

Fig. 4 is an elevation similar to Fig. 3, showing slidable sections upon the magnetic pole plates or strips for maintaining a fixed clearance between the same and the upper drum;

Fig. 5 is a side elevation of the magnetic conveyor shown in Fig. 4;

Fig. 6 is an enlarged, fragmentary, sectional view, taken as on the line 6—6, Fig. 4;

Fig. 7 is an enlarged, transverse sectional view, taken as on the line 7—7, Fig. 4;

Fig. 13 is a longitudinal sectional view through a magnetic drum designed for use with the horizontal magnetic field;

Fig. 14 is a transverse section, taken as on the line 14—14, Fig. 13;

Fig. 15 is a fragmentary, transverse sectional view through the lower portion of a magnetic conveyor showing a lower or tail drum; and, Fig. 16 is a similar view showing a magnetic tail drum for floor pick-up.

Referring now more particularly to the embodiments of the invention illustrated, in which similar numerals refer to similar parts throughout, the improved magnetic conveyor comprises an elongated frame indicated generally at 20. This frame is formed of spaced channel members 21 connected in spaced relation as by the cross bars 22 and pivotally mounted at its lower end for adjustment upon the base indicated generally at 23.

Figure 1:
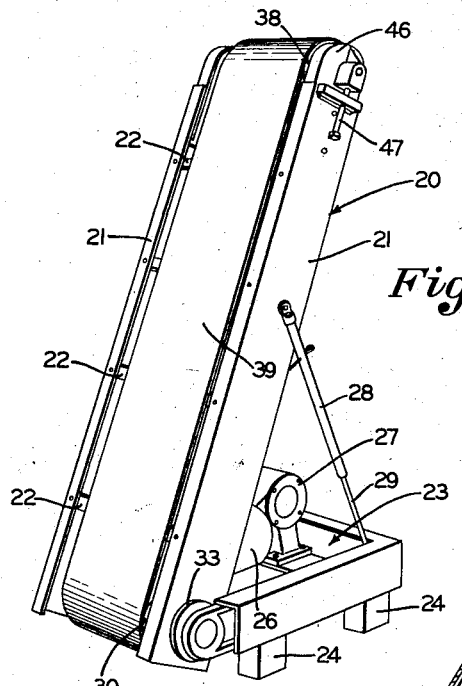
Fig. 1 is a perspective view of a magnetic conveyor embodying the invention.

This base is provided with feet 24 for supporting the same upon a floor or other horizontal surface as indicated at 25. A motor 26 and gear reducer 27 which is operatively connected thereto, are supported upon the base. The elongated conveyor frame 20 may be adjustably held at any desired angle by means of the telescoping tube and rod 28 and 29 as shown in Fig. 1.

The lower or tail drum 30 is mounted upon the shaft 31, which may form the pivot for the conveyor frame 20 upon the base 23. The shaft 31, as best shown in Fig. 15, is journalled in bearings 32 mounted in the bearing brackets 33 located within the lower portions of the channel frame members 21 and attached thereto as by bolts 34. A sprocket 35 is fixed upon the shaft 31 and connected by chain 36 with the sprocket 37 upon the gear reducer 27.

Figure 2:
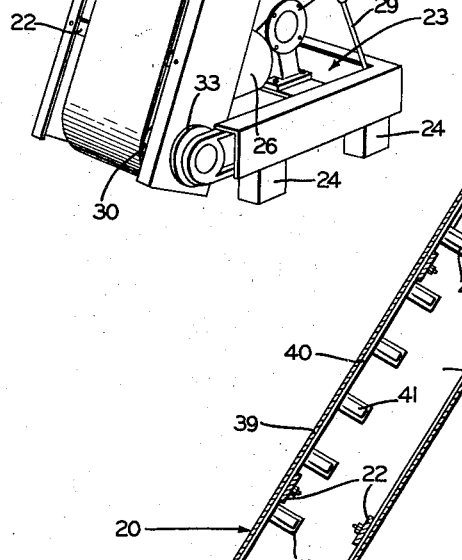
Fig. 2 is a longitudinal sectional view through a magnetic conveyor having longitudinal pole plates or strips forming the magnetic field, and showing a magnetic drum at the upper or head end of the conveyor.
Figure 3:
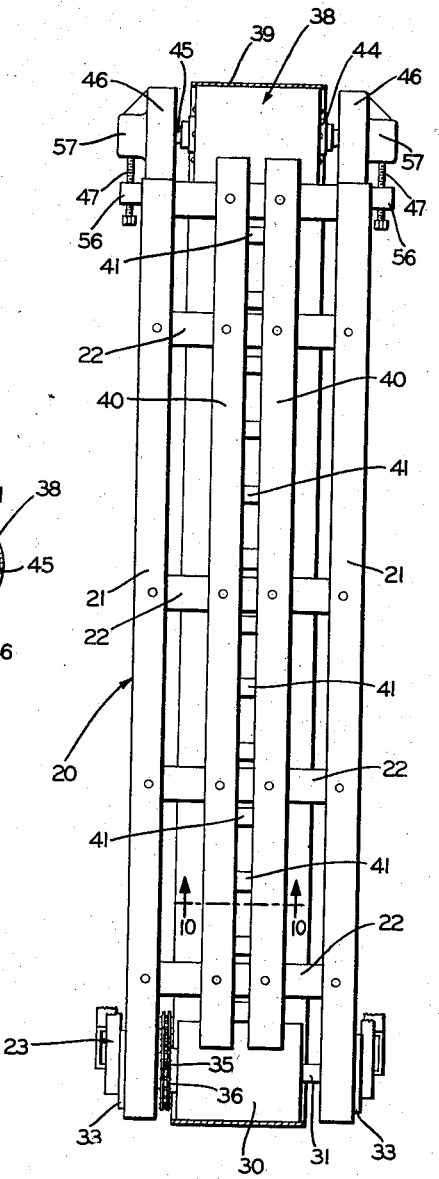
Fig. 3 is a plan view of the magnetic conveyor shown in Fig. 2 with the belt removed to disclose the magnetic field therebeneath.

The upper or head drum of the conveyor is indicated generally at 38 and is in the form of a magnetic drum. An endless belt 39 is located around the drums 30 and 38, as best shown in Figs. 1, 2 and 3.

Figure 10:
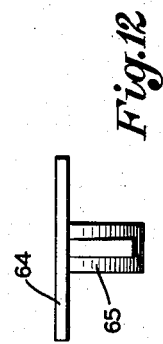
Fig. 10 is a detached, transverse section through the longitudinally disposed pole plates or strips taken as on the line 10—10, Fig. 3.

In the form of the invention shown in these three figures and in Fig. 10, a pair of spaced, parallel, longitudinally disposed pole plates or strips 40, with an air gap therebetween, are located directly beneath the upper or conveying flight of the belt 39 and attached to the cross bars 22.

These pole plates or strips extend throughout the length of the conveyor frame, terminating at their ends at points closely adjacent to the drums 30 and 38. Transversely disposed permanent horseshoe magnets 41 are connected at spaced intervals to the undersides of the pole plates or strips 40 throughout the length thereof. The pole plates 40 are thus magentized, providing in effect a permanent magnetic field extending from the lower or tail pulley 30 to the upper or head pulley 38.

Figure 9:
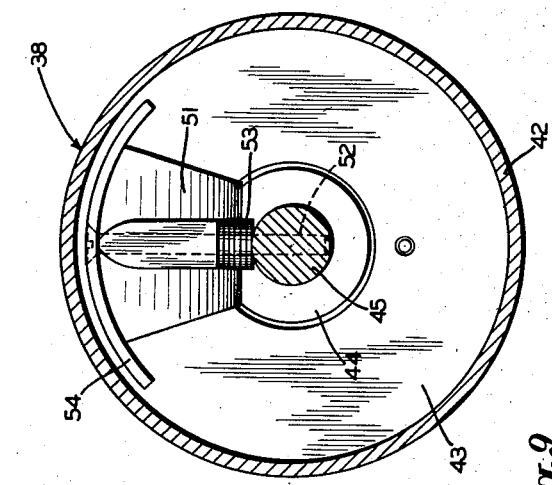
Fig. 9 is a transverse section through the drum, taken as on the line 9—9, Fig. 8.
Figure 8:
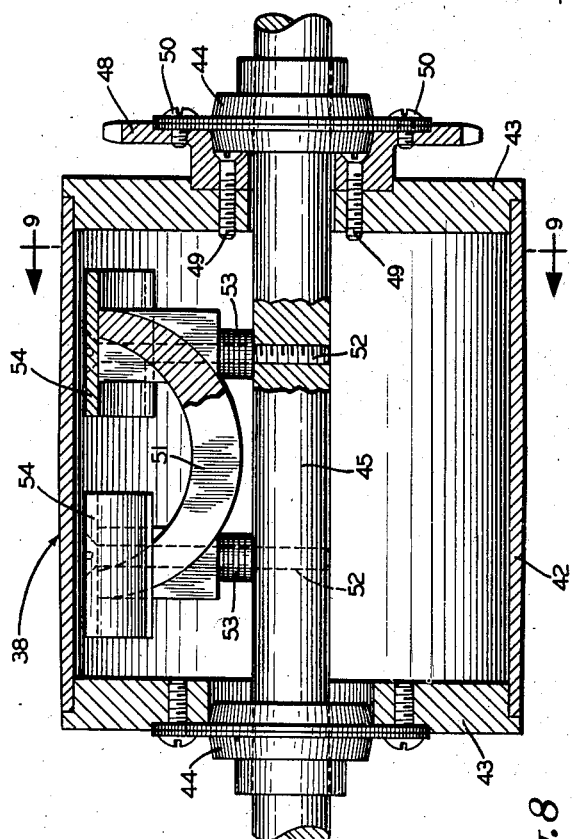
Fig. 8 is a longitudinal sectional view through a magnetic drum designed for use with the longitudinal pole plates or strips.

The magnetic drum 38, designed for use in connection with this type of magnetic field, is shown in detail in Figs. 8 and 9 and comprises the hollow, cylindrical shell 42, formed of aluminum or the like, with end hubs 43 within which are mounted the ball bearings 44, by means of which the drum shell is rotatably mounted upon the stationary shaft 45, the ends of which are stationarily mounted in the take-up top frame members 46 attached to the channel frame members 21, as by the bolts 47.

In the event it may be desirable to drive the upper or head drum rather than the lower or tail drum, a sprocket 48 may be attached to one end hub 43 of the drum, as by the screws 49, and the corresponding roller bearing 44 may be attached to the sprocket as by screws 50.

A fixed magnetic field is provided within the revolving drum shell 42 and preferably may cover approximately 135° to 180° of the circumference of the drum shell. This magnetic field comprises a horseshoe magnet 51 attached to the stationary shaft 45, as by bolts 52, with shims 53 provided between the magnet and the shaft for positioning the poles of the magnet at the desired distance from the inside of the shell 42.

Arcuate pole plates 54, aligned with the pole strips 40, are attached to the poles of the magnet 51 and lo cated closely adjacent to the inner surfaces of the revolving drum shell 42. As shown in Fig. 2, the magnet 51 may be adjusted upon the shaft 45 so that there is only a slight gap between the adjacent ends of the pole strips 54 and pole plates 40, in order to link the magnetic flux from the parallel strips 40 to the pole plates 54.

In the operation of this magnetic conveyor, ferrous articles are fed to the lower end of the upper or conveying flight of the belt 39, and the ferrous parts will be held upon the upwardly moving belt, by the magnetic field thereunder, so that the articles will be carried to the top or head end of the conveyor and will be discharged therefrom as they pass out of the magnetic field of the head drum 38.

The magnet 51 may be adjusted upon the stationary shaft 45 at any desired position around the circumference of the drum so as to regulate the position of discharge of ferrous articles from the head drum.

In Figs. 4 to 7 is shown means for maintaining a very close clearance between the longitudinal pole plates or strips and the surface of the upper or head drum, so as to compensate for movement of the take-up end frame members relative to the channel side frames 21, in order to take up stretch in the belt 39.

In this form of the invention, the channel side frame members 21, the upper take-up frame members 46, and the tail and head drums 30 and 38 respectively, may be the same as shown in Figs. 1 to 3 and 8 and above described in detail.

The take-up end frame members 46 are slidably mounted in the upper ends of the channel frame members 21 and adapted to be adjusted longitudinally therein by the screws 47, threaded through the lugs 56 upon the channel frame members 21 and engaging the bosses 57 upon the take-up end frame members 46.

Cross bars 22 may be connected at their ends to the channel frame members 21 for supporting the magnetic field beneath the belt in the same manner as in Figs. 1 to 3.

Spaced, longitudinally disposed, parallel pole plates or strips 40a are attached to the cross bars 22 and extend throughout the length of the conveyor frame, approximately from one drum to the other. Stationary pole strip sections 40b, extending from the lower end of the frame to a point intermediate the ends thereof, are mounted upon the strips 40a and attached to the lower strips 40a and to the cross bars 22 as by bolts 58.

Magnets 41 are located transversely beneath the strips 40a, and opposite poles thereof are attached to said strips in the manner of the magnets in Figs. 2, 3 and 10 and above described. In the upper portion of the conveyor frame, a spacer bar 59 is located between the strips 40a, and attached to the cross bars 22, as by bolts 60 and guide bars 61 are located at the outer edges of the strips 40a and attached to the cross bars as by bolts 62. The spacer bar 59 and guide bars 61 are preferably formed of aluminum.

Slidably mounted upon the upper end portions of the pole strips 40a, and located between the spacer bar 49 and the guide bars 61, is a pair of adjustable pole strips or plates 40b, connected at their upper ends to the take-up end frame members 46, as by a cross bar 63.

It will thus be seen that as the take-up end frame members 46 are moved longitudinally in the channel side frame members 21, by means of the adjusting screws 47, in order to take-up any stretch in the belt, the adjustable pole strips 40b will be moved in unison therewith so as to always maintain the same clearance between the magnetic strips 40b and the magnetic field of the upper drum.

In cases where the magnetic conveyor is to be used for conveying cylindrical articles, a different arrangement of magnetic pole pieces is provided. Instead of providing pole plates or strips extending longitudinally, parallel to the belt travel, a plurality of transversely disposed pole plates are provided, located at right angles to the direction of travel of the belt.

Figure 11:
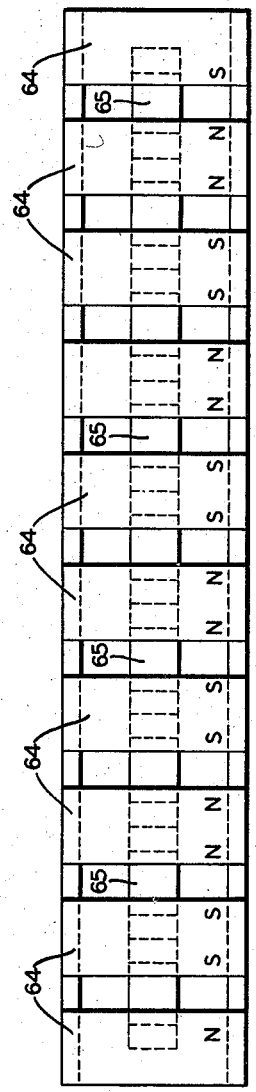
Fig. 11 is a plan elevation of the horizontal magnetic field for conveying cylindrical articles.
Figure 12:
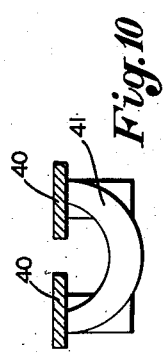
Fig. 12 is an end elevation of the horizontal magnetic field shown in Fig. 11.

Such a magnetic field is shown in Figs. 11 and 12, in which the spaced, transversely disposed pole plates 64 are provided, located at right angles to the direction of belt travel, to give a series of magnetic poles running in the polarity of north-south, north-south, etc., throughout the entire length of the conveyor.

Horseshoe magnets 65, of the same type as shown in Fig. 10, are connected to the undersides of the pole plates 64 in the manner shown in Fig. 11, and arranged as shown, opposite poles of each magnet being connected to two adjacent pole plates, similar poles of adjacent magnets being connected to each plate.

This type of magnetic field is required for cylindrical articles, because, normally all ferrous articles of any length tend to bridge across north and south poles. With a magnetic field such as shown in Fig. 11, cylindrical articles will bridge the north and south poles and the articles will thus be oriented longitudinally of the conveyor belt so that in being carried upward upon the moving belt, they cannot roll down upon the belt.

For the type of magnetic field shown in Fig. 11, the magnetic field in the upper or head drum 38 will be of the arrangement shown in Figs. 13 and 14. The drum itself may be of the same construction and design as shown in Figs. 8 and 9, comprising the hollow cylindrical drum shell 42 with hub ends 43, rotatably mounted upon the stationary shaft 45 as by roller bearings 44.

The stationary magnetic field within the drum comprises a horseshoe magnet 66, with the poles thereof disposed transversely of the drum, an arcuate pole plate 67 being attached to each pole of the magnet and located adjacent to the inner wall of the drum shell 42.

The magnet 66 may have an elongated base plate 68 welded thereto and rigidly attached to the stationary shaft 45 as by the screws 69. This type of magnetic field within the head roller will cooperate with the magnetic field in the conveyor frame as shown in Fig. 11, to carry cylindrical articles around the head drum to the discharge point, maintaining them in the same position in which they are carried up upon the belt.

In the event that it may be desirable to pick up articles, ferrous scrap or the like from the floor, the lower or tail drum may be in the form of a hollow drum shell rotating about a stationary magnetic field located within the lower portion of the drum, as shown in Fig. 16.

In this form of drum a hollow, cylindrical shell 70 is provided with hub ends 71, roller bearings 72 being provided for rotatably mounting the drum shell upon the stationary shaft 73. If the lower or tail drum is to be driven, a sprocket 74 may be connected to one of the hub ends 71, as by screws 75, for connection by sprocket chain to a motor-driven gear reducer in the manner shown in Figs. 1 and 2.

The stationary magnetic field within the drum shell comprises a horseshoe magnet 76, with the poles thereof located longitudinally of the stationary shaft 73, the magnet being attached to the stationary shaft as by screws 77, with shims 78 for properly spacing the poles of the magnet adjacent to the inner walls of the revolving drum shell 70.

Arcuate pole plates 79 are attached to the poles of the magnet 76 and adapted to be positioned relative to the pole strips of the conveyor so that articles may be picked up from the floor by the belt passing around the magnetic field of the tail drum, and carried up the belt to the discharge end thereof.

From the above it will be apparent that the embodiments of the invention disclosed provide certain advantages over present practice in magnetic conveyors. The revolving drum shell at the head end of the conveyor, with stationary magnetic field therein, located in proximity to, and conforming in arrangement with, the magnetic pole plates or strips in the conveyor frame provides a distinct advantage in conveying articles around the head drum to the discharge point.

The permanent magnetic field within the revolving drum shell of the head drum may be adjusted upon the stationary shaft to position the discharge point as desired. The hollow revolving drum shell with stationary magnetic field therein, in the tail drum of the conveyor, provides means for easily and readily picking up ferrous articles or scrap from the floor, or other support upon which the conveyor is mounted, and conveying the same upward upon the belt to the discharge point.

It will also be evident that the sliding pole strip or plate arrangement, shown in Figs. 4 to 7, provides means for automatically maintaining a very close clearance between the magnetic bars and the drum surface in order to link the magnetic flux from the parallel bars to the magnetic field within the upper or head drum.

It will also be evident that the special arrangement and construction of magnetic fields upon the conveyor frame and within the upper or head drum for orienting cylindrical articles and carrying them longitudinally upward upon the belt without danger of their rolling down thereon, provides a considerable advantage over prior practice.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A magnetic conveyor comprising an elongated frame, a tail drum rotatably mounted in the charging end of the frame, a take-up end frame longitudinally adjustably mounted in the discharge end of said elongated frame, a head drum rotatably mounted in said take-up end frame, an endless belt located around said drums, a magnetic field carried by the elongated frame and located directly beneath the upper flight of said belt, said magnetic field comprising a spaced pair of longitudinally disposed stationary pole strips extending substantially from one of said drums to the other drum, transversely disposed horseshoe magnets connected at opposite poles to said pole strips, longitudinally disposed pole strip sections slidably mounted upon the upper end portions of said stationary pole strips, means connecting the upper ends of said slidable pole strip sections to said take-up end frame, the head drum comprising a rotatable cylindrical shell and a stationary magnetic field located within said rotatable shell, and means for longitudinally adjusting said take-up end frame relative to said elongated frame to compensate for belt stretch, whereby said slidable pole strip sections will be moved with said take-up end frame to maintain a uniform close clearance between the longitudinal pole strips and the surface of the rotatable shell in order to link the magnetic flux from the longitudinal pole strips to the magnetic field in the head drum.

2. A magnetic conveyor comprising an elongated frame, a tail drum rotatably mounted in the charging end of the frame, a take-up end frame longitudinally adjustably mounted in the discharge end of said elongated frame, a head drum rotatably mounted in said take-up end frame, an endless belt located around said drums, a magnetic field carried by the elongated frame and located directly beneath the upper flight of said belt, said magnetic field comprising a spaced pair of longitudinally disposed stationary pole strips extending substantially from one of said drums to the other drum, transversely disposed horseshoe magnets connected at opposite poles to said pole strips, stationary pole strip sections fixed upon the lower end portions of said pole strips, longitudinally disposed pole strip sections slidably mounted upon the upper end portions of said stationary pole strips, a spacer bar located between said slidable pole strip sections, guide bars located upon the outer sides of said slidable pole strip sections, means connecting the upper ends of said slidable pole strip sections to said take-up end frame, the head drum comprising a rotatable cylindrical shell and a stationary magnetic field located within said rotatable shell, and means for longitudinally adjusting said take-up end frame relative to said elongated frame to compensate for belt stretch, whereby said slidable pole strip sections will be moved with said take-up end frame to maintain a uniform close clearance between the longitudinal pole strips and the surface of the rotatable shell in order to link the magnetic flux from the longitudinal pole strips to the magnetic field in the head drum.

3. A magnetic conveyor comprising an elongated frame, a tail drum rotatably mounted in the charging end of the frame, a take-up end frame longitudinally adjustably mounted in the discharge end of said elongated frame, a head drum rotatably mounted in said take-up end frame, an endless belt located around said drums, a magnetic field carried by the elongated frame and located directly beneath the upper flight of said belt, said magnetic field comprising a spaced pair of longitudinally disposed stationary pole strips extending substantially from one of said drums to the other drum, transversely disposed horseshoe magnets connected at opposite poles to said pole strips, longitudinally disposed pole strip sections slidably mounted upon the upper end portions of said stationary pole strips, means connecting the upper ends of said slidable pole strip sections to said take-up end frame, the head drum comprising a rotatable cylindrical shell and a stationary magnetic field located within said rotatable shell, lugs upon the upper end portion of said elongated frame, bosses on said take-up end frame and adjusting screws threaded through said lugs and contacting said bosses for longitudinally adjusting said take-up end frame relative to said elongated frame to compensate for belt stretch, whereby said slidable pole strip sections will be moved with said take-up end frame to maintain a uniform close clearance between the longitudinal pole strips and the surface of the rotatable shell in order to link the magnetic flux from the longitudinal pole strips to the magnetic field in the head drum.

4. A magnetic conveyor comprising an elongated frame, a tail drum rotatably mounted in the charging end of the frame, a take-up end frame longitudinally adjustably mounted in the discharge end of said elongated frame, a head drum rotatably mounted in said take-up end frame, an endless belt located around said drums, a magnetic field carried by the elongated frame and located directly beneath the upper flight of said belt, said magnetic field comprising a spaced pair of longitudinally disposed stationary pole strips extending substantially from one of said drums to the other drum, magnets connected to said pole strips, longitudinally disposed pole strip sections slidably mounted upon the upper end portions of said stationary pole strips, means connecting the upper ends of said slidabl pole strip sections to said take-up end frame, and means for longitudinally adjusting said take-up end frame relative to said elongated frame to compensate for belt stretch and to move said slidable pole strip sections so as to maintain a uniform close clearance between the pole strips and the head drum.

5. A magnetic conveyor comprising an elongated frame, a tail drum rotatably mounted in the charging end of the frame, a take-up end frame longitudinally adjustably mounted in the discharge end of said elongated frame, a head drum rotatably mounted in said take-up end frame, an endless belt located around said drums, a magnetic field carried by the elongated frame and located directly beneath the upper flight of said belt, said magnetic field comprising a spaced pair of longitudinally disposed stationary pole strips exteneding substantially from one of said drums to the other drum, transversely disposed horseshoe magnets connected at opposite poles to said pole strips, longitudinally disposed pole strip sections slidably mounted upon the upper end portions of said stationary pole strips, means connecting the upper ends of said slidable pole strip sections to said take-up end frame, and means for longitudinally adjusting said take-up end frame relative to said elongated frame to compensate for belt stretch and to move said slidable pole strip sections so as to maintain a uniform close clearance between the pole strips and the head drum.

References Cited in the file of this patent

UNITED STATES PATENTS

| Number | Name | Date |
|---|---|---|
| 306,778 | Ripley | Oct. 21, 1884 |
| 420,334 | Conkling | Jan. 28, 1890 |
| 422,732 | Conkling | Mar. 4, 1890 |
| 463,305 | Hoffman | Nov. 17, 1891 |
| 1,773,646 | Skoo | Aug. 19, 1930 |
| 2,380,550 | Reed | July 31, 1945 |
| 2,642,174 | Buccicone | June 16, 1953 |